(12) United States Patent
Toccassi

(10) Patent No.: US 11,459,175 B2
(45) Date of Patent: Oct. 4, 2022

(54) ARRANGEMENT AND METHOD FOR STORING ITEMS

(71) Applicant: T.B. TECNICA S.R.L., Avigliana (IT)

(72) Inventor: Luciano Toccassi, Avigliana (IT)

(73) Assignee: T.B. TECNICA S.R.L., Avigliana (IT)

( * ) Notice: Subject to any disclaimer, the term of this patent is extended or adjusted under 35 U.S.C. 154(b) by 0 days.

(21) Appl. No.: 17/612,448

(22) PCT Filed: May 15, 2020

(86) PCT No.: PCT/IB2020/054624
§ 371 (c)(1),
(2) Date: Nov. 18, 2021

(87) PCT Pub. No.: WO2020/240326
PCT Pub. Date: Dec. 3, 2020

(65) Prior Publication Data
US 2022/0204267 A1    Jun. 30, 2022

(30) Foreign Application Priority Data

May 31, 2019    (IT) .......................... 102019000007797

(51) Int. Cl.
*B65G 1/10* (2006.01)
*B65G 1/04* (2006.01)

(52) U.S. Cl.
CPC ............. *B65G 1/10* (2013.01); *B65G 1/0485* (2013.01); *B65G 2203/0208* (2013.01)

(58) Field of Classification Search
CPC ...................................................... B65G 1/10
See application file for complete search history.

(56) References Cited

U.S. PATENT DOCUMENTS

| 5,065,872 A | 11/1991 | Simon |
| 8,635,460 B2 | 1/2014 | Liardet et al. |
| 2003/0065421 A1 | 4/2003 | Didriksen et al. |

(Continued)

FOREIGN PATENT DOCUMENTS

| CN | 208103028 U | 11/2018 |
| DE | 102004058216 A1 | 6/2006 |

(Continued)

OTHER PUBLICATIONS

International Search Report and Written Opinion of the International Searching Authority issued for International PCT Application No. PCT/IB2020/054624 dated Sep. 21, 2020.

*Primary Examiner* — Saul Rodriguez
*Assistant Examiner* — Willie Berry, Jr.
(74) *Attorney, Agent, or Firm* — Howson & Howson LLP

(57) ABSTRACT

An arrangement and method for storing items is provided which may be applied, for example, in the storage of postal packages and the like. The size of an item to be stored is detected and the item is placed inside a storage structure in sufficient, but not excessive, space. In the arrangement and method, at least two, preferably three, dimensions of the item in directions perpendicular to each other are considered to determine the space in which to store it. Correspondingly, the storage structure of the arrangement comprises a plurality of vertical racks in which rack groups are present in which compartments of different width, and possibly of different depth, can be defined. The racks can possibly be mounted on rotatable platforms to further increase the capacity of the storage structure.

3 Claims, 6 Drawing Sheets

(56) References Cited

U.S. PATENT DOCUMENTS

2018/0014438 A1 1/2018 Bilato et al.
2019/0392667 A1 12/2019 Naaman

FOREIGN PATENT DOCUMENTS

| EP | 1273531 A1 | 1/2003 |
| EP | 1672830 A1 | 6/2006 |
| WO | 2016/103154 A1 | 6/2016 |
| WO | 2018/154526 A1 | 8/2018 |

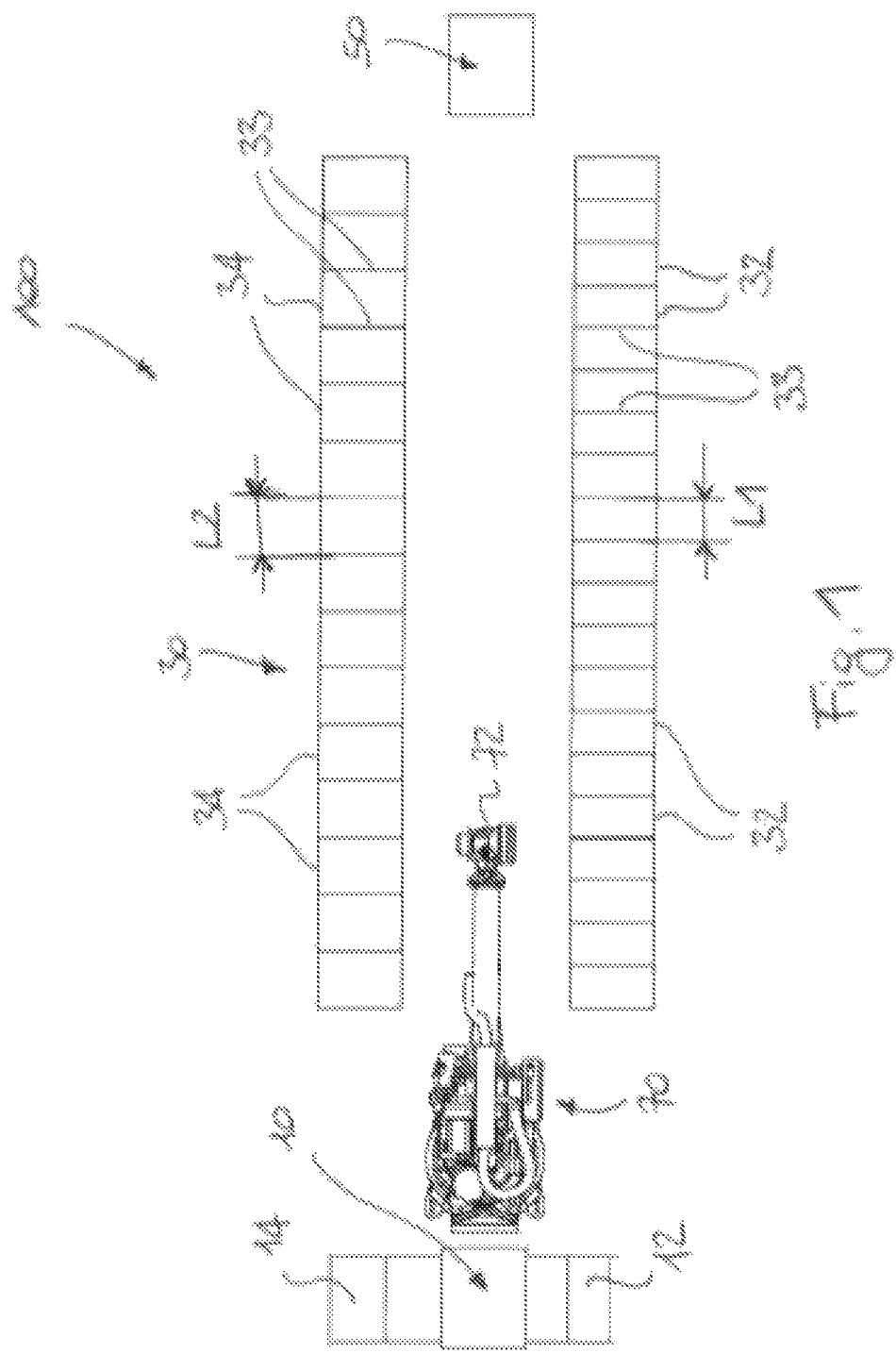

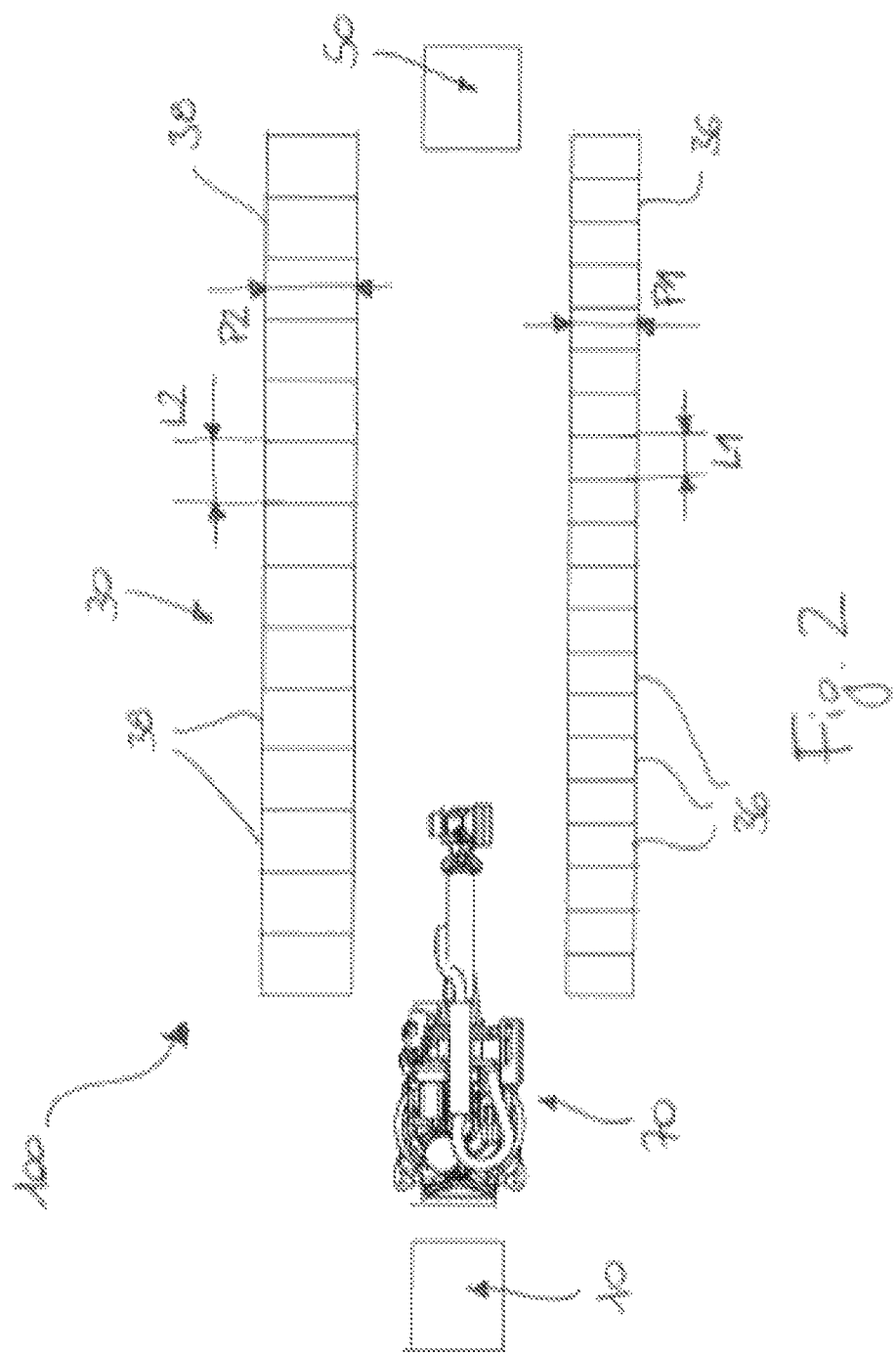

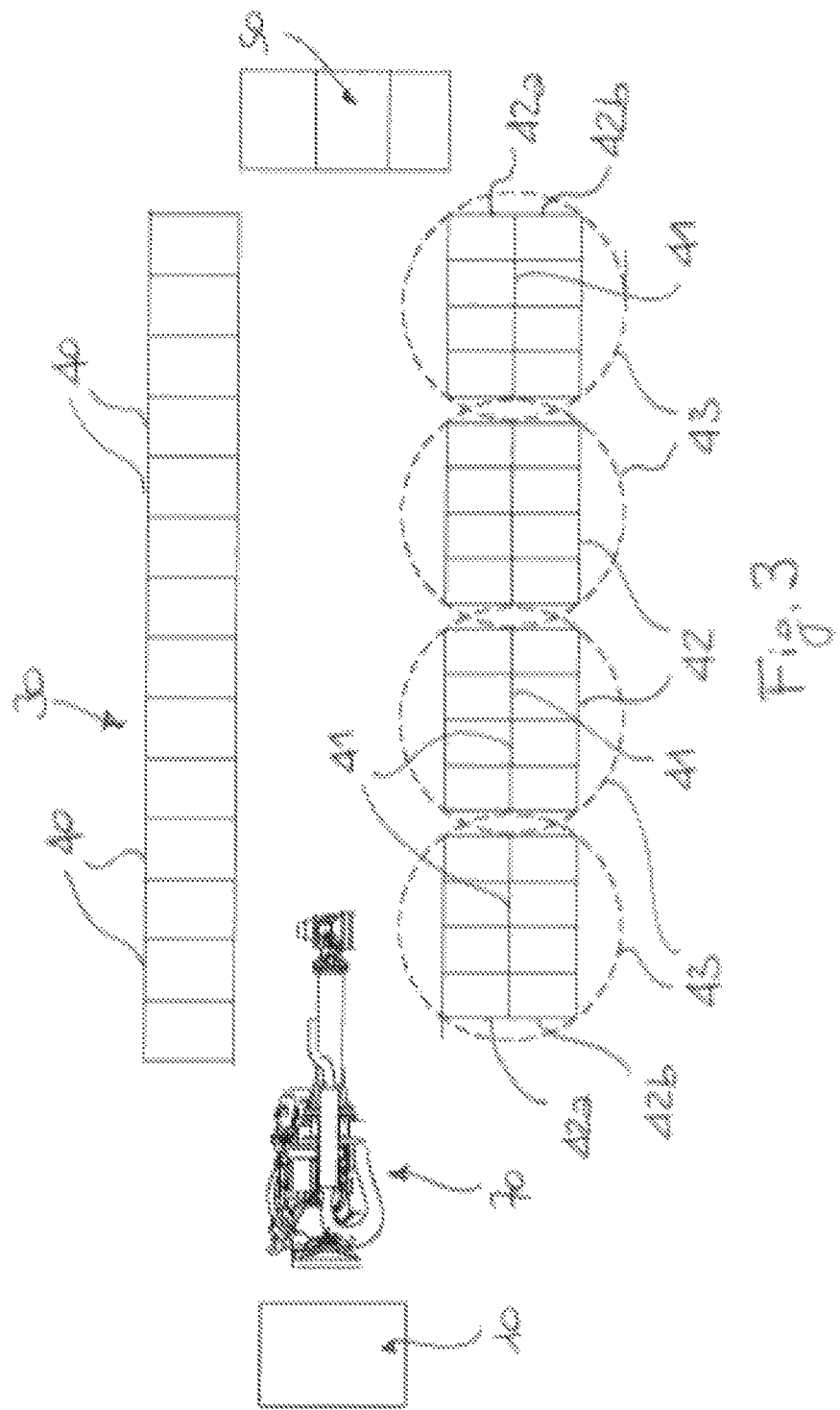

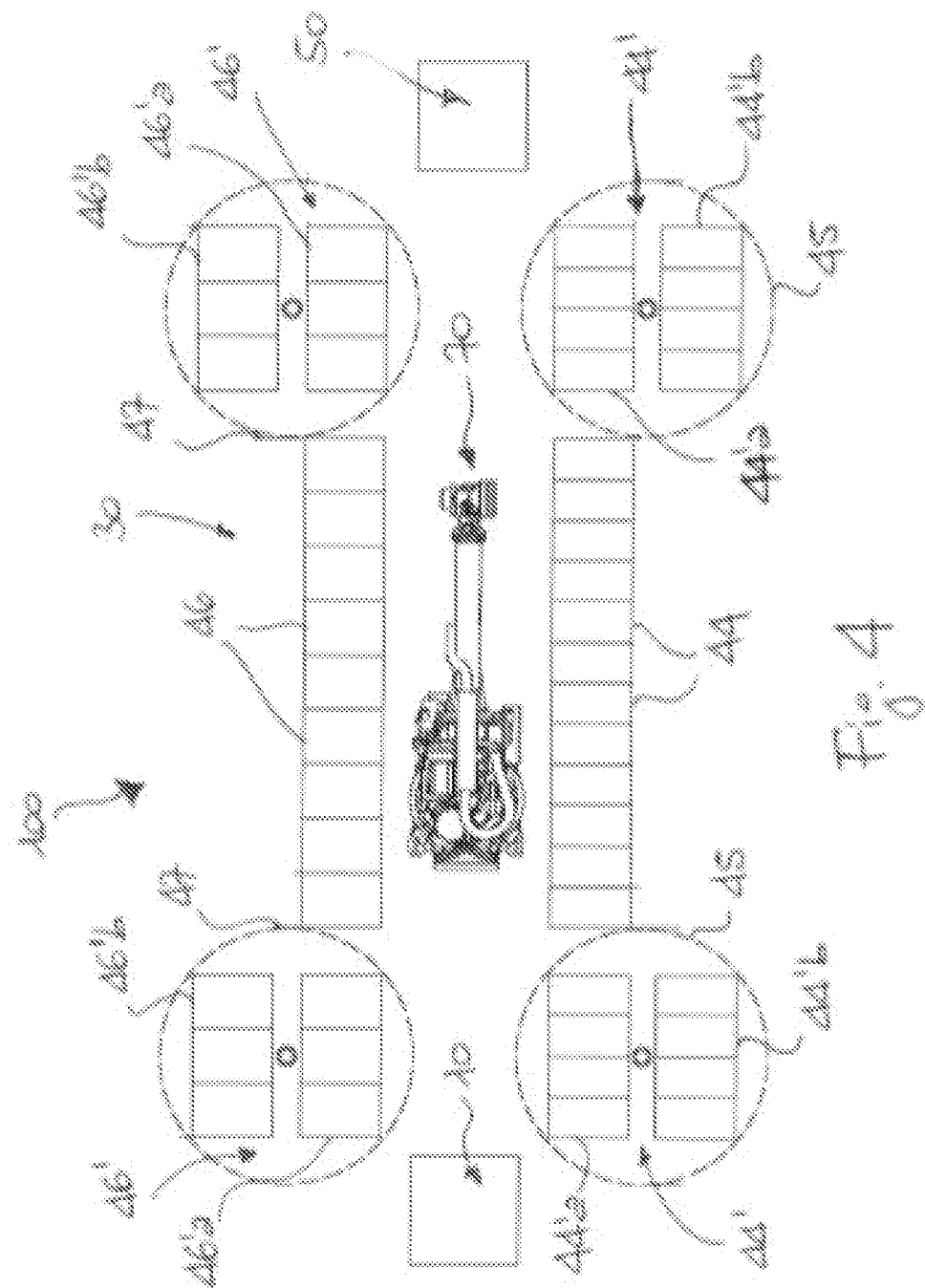

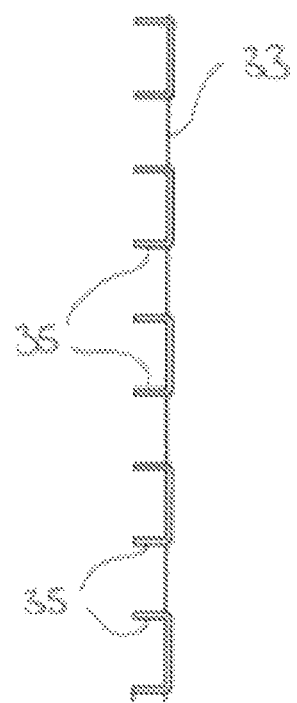

ARRANGEMENT AND METHOD FOR STORING ITEMS

TECHNICAL FIELD

The present invention relates to an arrangement and a method for storing items. The present invention finds particular application in the storage of packages, such as postal packages.

Background Art

Arrangements and methods for receiving, storing and delivering items are known.

For example, postal packages are continuously received at post offices, which packages must be stored until the recipient comes to collect them, and therefore delivered to the recipient himself/herself.

The need to store such packages until collection poses a number of problems, on the one hand because the packages are of the most disparate sizes and on the other hand because it is not possible to predict how long such packages will have to be stored (since the timing of their collection depends on the recipients of such packages and not on the operators of the post offices).

In particular, the very different sizes of the packages to be stored can lead to high inefficiency in space management.

In particular, in the case where the post office warehouse provides for a plurality of storage compartments all with the same size, the result is that significant empty space will remain in some compartments storing very small packages, while very bulky packages may not even enter such compartments.

On the other hand, it is clear that it is not possible to provide for placing multiple postal packages within the same compartment until it is completely filled, as this solution would entail considerable inconvenience in identifying the correct postal package at the time of delivery. It is therefore necessary that each compartment contains only one package.

It should also be considered that these warehouses are limited in size and are often provided underground, so that any expansion work would be extremely difficult and expensive, if not impossible.

In order to overcome the drawbacks described above, arrangements and methods have been developed in the past to optimize the use of space in environments intended for storing items. Document EP 1 672 830 describes a storage arrangement which comprises vertical racks, among which a plurality of shelves of arranged. These shelves are arranged at different distances from each other in the vertical direction, thus defining corresponding compartments of different height. The storage arrangement provides that the dimensions of the items to be stored are measured, so that items of height appropriate with respect to the height of the corresponding compartment are arranged on a shelf and that a plurality of items are arranged on said shelf until it is completely filled in width.

This type of solution has several disadvantages.

First, the shelves define compartments of defined and unchangeable heights. Consequently, while providing for the shelves to be mounted at different distances from one another, the versatility of the storage arrangement described above is limited. Second, in said storage arrangement a plurality of items is stored on the same shelf (i.e. in the same compartment), and the absence of a one-to-one correspondence between the compartment and the stored item can lead to errors in memorizing the correct position of each item.

Document WO 2016/103154 describes a storage arrangement which comprises vertical racks provided with a plurality of supports, on which trays carrying respective items can be positioned.

However, the storage arrangement described in this document is intended for substantially two-dimensional items, which are completely accommodated in recessed seats provided in the respective trays, so that the height of the items to be stored is constant and substantially equal to the height of the corresponding tray. It follows that this storage arrangement does not lend itself to the storage of three-dimensional items, possibly of significant height.

Document U.S. Pat. No. 5,065,872 describes a storage arrangement which comprises vertical racks, among which a plurality of shelves of arranged. Said vertical racks, with the relative shelves, are mounted on a handling system so that they can be moved according to a predefined path.

However, no compartments of varying dimensions are provided in the storage arrangement described in this document. Furthermore, although movable, the compartments always face the operator on the same side, whereby the operator does not have access to the opposite part of the compartment for the possible insertion of an additional item into the rear portion of the same compartment.

Document EP 1 273 531 describes a storage arrangement for storing items to be distributed, e.g. postal packages.

Said storage arrangement comprises one or more vertical racks, of the type commonly used, for example, in canteens for storing trays at the end of the meal.

As is the case in canteens, said storage arrangement further comprises a plurality of trays on which the items to be stored can be placed and which can be inserted on the supports of one of said vertical racks, at a height that takes into account the items already present on the rack and which is adequate with respect to the height of the item to be stored.

The aforementioned storage arrangement comprises a sensor system for determining the size of a received object, in particular its height, and a control system that allows to determine, based on the output of the aforementioned sensor system and on the data contained in a memory unit and related to the items already present in the warehouse, in which rack to place the new item and at what height of said rack to insert the tray that carries the item.

In this way, it is possible, on the one hand, to allocate sufficient space to the item to be stored, and on the other hand to minimize the distance between the tray carrying the item and the top of the item carried by the underlying tray of the same rack.

The storage arrangement may be flexible, meaning that items may be periodically reorganized within the storage arrangement, so as to further improve the utilization of space.

A storage arrangement of the type described above, although it has advantages with respect to a warehouse with fixed-size compartments for receiving the items to be stored, is not without limitations.

In particular, although it is alleged that in the step of detecting the size of the item to be stored several dimensions of said item can be measured, in the actual storing step only the height of said item is taken into account.

This is also evident from the fact that the storage arrangement described in document EP 1 273 531 provides for the use of trays all of the same size.

As a result, while the unused space in the vertical direction can be reduced and optimized, there is still considerable unused space in the horizontal direction.

For example, in the storage arrangement described in EP 1 273 531 a candelabra and a pot having the same height would be treated in the same way, although it is evident that they have completely different overall dimensions.

The object of the present invention is therefore to overcome the limitations of the prior art by providing an arrangement and a method for storing items that allow to effectively optimize the use of space in an environment intended for storing items.

This and other objects are achieved by an arrangement and a method for storing items as claimed in the appended claims.

SUMMARY OF THE INVENTION

The arrangement and method for storing items provide for detecting the size of an item to be stored and placing said item in a storage structure so that said item is stored in a sufficient, but not excessive, space.

In the storage arrangement and method according to the invention, at least two dimensions of the item in directions perpendicular to each other are taken into account in determining the space in which the item is to be stored.

Preferably, in the storage arrangement and method according to the invention, three dimensions of the item in directions perpendicular to each other are taken into account in determining the space in which the item is to be stored According to the invention, the storage structure comprises a plurality of vertical racks, each comprising at least a pair of parallel and facing vertical walls that carry, on the facing faces, a plurality of supports adapted to receive removable supporting elements that carry the items to be stored. Each removable support element, once inserted on the supports of two vertical walls facing a vertical rack, defines with said vertical walls a compartment for storing an item, which is delimited below by said supporting element and laterally by said vertical walls, and which may possibly be delimited above by a supporting element subsequently inserted in the same vertical rack.

According to the invention said plurality of racks comprises two or more rack groupsgroups in which the distance between respective parallel vertical walls is different from one groupgroup to another, so that two or more rack groupsgroups having compartments of different width from one groupgroup to another are definable.

It is understood that in this description:
"height" means the dimension in the vertical direction, i.e. perpendicular to the plane on which the storage structure rests;
"width" means the dimension in a direction perpendicular to the vertical direction and perpendicular to the planes on which the vertical walls of the racks of the storage structure lie;
"depth" means the dimension in a direction perpendicular to the vertical direction and parallel to the planes on which the vertical walls of the racks of the storage structure lie.

In a preferred embodiment of the invention, each vertical rack comprises a supporting frame comprising a pair of main vertical walls facing each other and provided with supports on the facing faces.

In this embodiment, a storage structure can be provided comprising two or more groups of vertical racks in which main vertical walls are placed at different distances from each other. In an alternative embodiment, it would also be possible to provide that in at least one rack group each rack comprises, in addition to the main vertical walls of the supporting frame, also a vertical bulkhead removably arranged between and parallel to the main vertical walls of said rack.

In this embodiment, at the same distance between the main vertical walls of the rack supporting frame, rack groups can be obtained with compartments of different widths, suitably arranging said vertical bulkheads between the main vertical walls of the racks of one or more rack groups.

In one embodiment of the invention, it is possible to provide for mounting said main side walls—and said vertical bulkheads, if provided—movable on guides or rails, so that the distance therebetween can be modified.

In a preferred form of the invention, the storage structure of the storage arrangement comprises two or more groups of vertical racks in which compartments having different depths from one group to another are definable.

In a first variant of said embodiment, a storage structure comprising two or more rack groups in which the main vertical walls of the supporting frame have an extension in a direction transverse to height different from one group to another may be provided.

In an alternative variant of this embodiment, it would also be possible to provide that, the size as the main vertical walls of the supporting frame being the same, in at least one rack group each rack comprises a vertical bulkhead arranged between and perpendicular to the vertical walls of said rack, so as to define compartments of reduced depth.

In a preferred embodiment of the invention, the storage structure comprises at least one rack group in which each rack comprises a vertical bulkhead arranged between and perpendicular to the vertical walls of said rack, and the racks of said at least one rack group are mounted on respective rotatable platforms, so that said platforms can be rotated 180° to access the compartments of a first face or the compartments of an opposite second face of said racks.

Optionally, it would also be possible to provide that the position of said transverse vertical bulkheads may be changed so as to change the subdivision of the overall depth of the racks.

Note that rotatable platforms can also be adopted to increase warehouse capacity without a significant increase in the overall dimensions.

In this case, the storage arrangement according to the invention comprises at least one rack group comprising a first row of racks and a second row of racks facing each other and said rack group is mounted on a rotatable platform, with the two rows of racks arranged on opposite sides of the rotation axis of the rotatable platform.

In this way, by rotating the platform 180° it will be possible to access the racks of the first row or, alternatively, the racks of the second row.

By appropriately sizing the rotatable platform and the racks mounted thereon, it will be possible to introduce additional racks (those in the second row) without a significant increase in the overall dimensions.

Providing that all the vertical rack groups are arranged in two rows on a respective rotatable platform, it will even be possible to double the capacity of the storage arrangement, without a significant increase in the overall dimensions.

Advantageously, these rotatable platforms can be removable and transportable, so that they can only be used in case of need (for example, in the case where the items to be stored are postal packages, during the Christmas holidays).

The storage arrangement according to the invention comprises a sensor system for detecting the size of the items to be stored and a control device provided with a memory unit in which the geometry of the storage structure and the arrangement of the items already present in the warehouse are stored.

The control unit, based on the data detected by the sensor system and the data in the memory unit, determines on which rack and in which position to place a new item to be stored.

In a preferred embodiment of the invention, the control unit is configured to analyse data from the sensor system and to evaluate whether to store the item in the current position, in a rotated position (rotated about a vertical axis) or in a tilted position (rotated about a horizontal axis) and to store the item in question in a position that minimizes the unused space.

It is evident that in this embodiment, the storage arrangement will comprise means for turning and/or tilting the items.

Furthermore, in this embodiment, the storage arrangement will comprise a safety arrangement to prevent damaging the handled items, such as a safety arrangement to prevent fragile items from being tilted.

As mentioned above, the stored items are preferably postal packages.

BRIEF DESCRIPTION OF THE DRAWINGS

Further features and advantages of the invention will be more apparent from reading the following detailed description of some preferred embodiments of the invention itself, given by way of non-limiting example, with reference to the accompanying drawings, in which:

FIG. 1 is a schematic plan view of a storage arrangement according to a first embodiment of the invention;

FIG. 2 is a schematic plan view of a storage arrangement according to a second embodiment of the invention;

FIG. 3 is a schematic plan view of a storage arrangement according to a third embodiment of the invention;

FIG. 4 is a schematic plan view of a storage arrangement according to a fourth embodiment of the invention;

FIG. 5b shows a detail of the vertical wall of FIG. 5a.

DESCRIPTION OF THE EMBODIMENTS

Figure 5A:
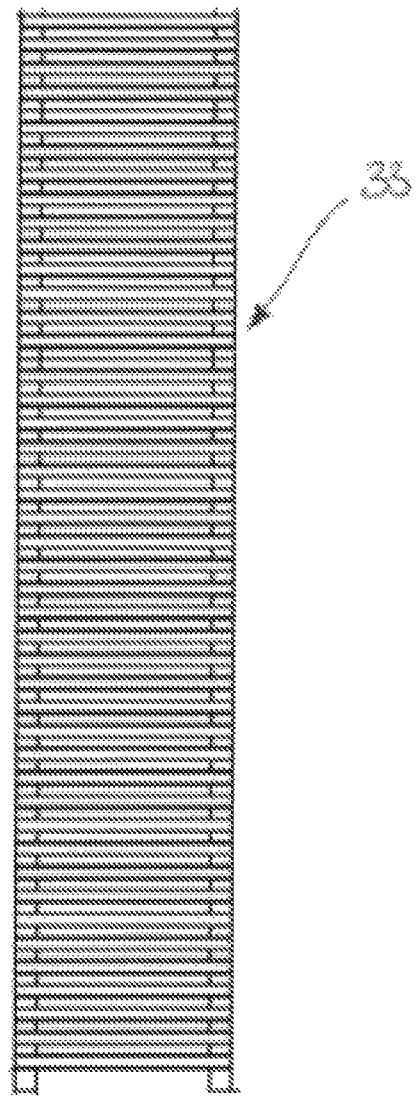
FIG. 5a shows an example of a vertical wall for the racks of the storage structure of the storage arrangement according to the invention.

In the following description of certain preferred embodiments of the invention, reference will be made to an application for storing postal packages at a post office warehouse.

It is understood that such application should not be construed as limiting and that the invention may also be implemented in other sectors, for the storage of items of any nature, both in fixed installations and in movable installations.

With reference to FIG. 1, a postal package storage arrangement according to a first embodiment of the invention is schematically shown in a plan view.

Generally, the storage arrangement 100 comprises a loading station 10, in which the packages to be stored are delivered and taken charge of by the arrangement, a storage structure 30, in which the packages are stored, and an unloading station 50, in which the packages are returned to be collected by the recipient.

The loading station 10 and the unloading station 50 may be separated, as in the illustrated example, but may also be coincident.

The storage structure 30 comprises a plurality of vertical racks 32, 34, each comprising a supporting frame comprising a pair of main vertical walls 33 arranged parallel and facing each other.

Said vertical racks 32 are preferably arranged in one or more arrays, arranged along the walls of the environment in which the storage arrangement is installed.

An example of a main vertical wall 33 for a rack of the storage structure 30 is shown in FIGS. 5a, 5b.

As can be seen in said figures, each main vertical wall 33 is formed by a flat plate that carries on at least one of the surfaces thereof a plurality of supports 35 oriented horizontally (i.e. parallel to the plane on which the wall 33 rests) and distributed along the height of the vertical wall 33.

Preferably, the supports 35 are all the same and are evenly distributed along the height of the vertical wall 33.

In the example shown, the supports 35 are made in the shape of "C"-section guides, but other shapes may also be possible.

For example, in a particularly simple embodiment, said supports could be made in the form of cantilevered slats mounted on at least one surface of the plate forming the vertical wall 33.

Each rack is formed by arranging a pair of equal main vertical walls 33 parallel and facing each other, arranged with the respective surfaces carrying the supports 35 facing each other.

Note that the racks can be made with main vertical walls that differ in size and/or the spacing of the supports provided thereon.

It is evident that providing racks formed by main vertical walls 33 that carry differently sized and/or distributed supports 35 increases the degrees of freedom in the construction of the structure 30 and in the storage of the packages.

With reference to FIG. 1 and the arrays of vertical racks 32, 34 illustrated therein, it will also be clear to the person skilled in the art that the intermediate racks can be made:
  either by constructing each rack with main vertical walls 33 of the type shown in FIGS. 5a, 5b and arranging the surfaces without supports of the main lateral walls of two racks adjacent to each other,
  or by providing main vertical walls 33 having supports 35 on both surfaces, so that each of these main vertical walls can cooperate with respective vertical walls arranged on the two opposite sides to form two adjacent vertical racks.

The supports 35 of the vertical walls 33 of the vertical racks 32, 34 are adapted to accommodate and support removable supporting elements in which the packages are received and which will be described in detail in the following.

Similarly to that described in EP 1 273 531, a package—on its supporting element—can be inserted in a vertical rack by selecting the most advantageous supports to ensure sufficient space for the package and at the same time minimize unused space; in other words, said package will be placed on the free supports immediately above an underlying package already present in the storage structure.

According to the invention, at least two dimensions of the package to be stored in directions perpendicular to each other are taken into account in determining the space in which the item is to be stored.

In particular, in the embodiment illustrated in FIG. 1, in addition to the height of the package, its width is also taken into account.

Accordingly, the storage structure 30 of FIG. 1 comprises a first group of vertical racks 32 whose main vertical walls are arranged at a first distance L1 from each other and a second group of vertical racks 34 whose main vertical walls are arranged at a second distance L2 from each other, different from—and for example greater than—said first distance L1.

In this way, once a package has been measured at the loading station 10, it will be directed to a rack of the first rack group 32 if its width is lower than said first width L1 and to a rack of the second rack group 34 only if its width is greater than said first width L1.

In this way, the empty lateral spaces between the package and the main vertical walls of the rack in which it is received can be minimized.

Although two rack groups with different widths are illustrated in FIG. 1, it is apparent that the storage structure 30 could comprise any number of vertical rack groups with different widths.

In particular, the number of groups and the values of the selected widths can be selected from time to time depending on the specific applications.

Note that as an alternative to the configuration of FIG. 1, it would also be possible to provide that the main vertical walls of all the vertical racks are at the same distance from each other and that in at least one rack group each rack comprises a vertical bulkhead removably arranged between and parallel to the main vertical walls of said rack.

In this way, a first column of compartments having a first certain width defined by the distance between a first main vertical wall and the additional vertical wall consisting of said vertical bulkhead and a second column of compartments having a second certain width defined by the distance between said additional vertical wall consisting of said vertical bulkhead and the second main vertical wall would be defined in the vertical rack.

It is evident that such a bulkhead would be provided on both opposite surfaces with supports 35, sized and distributed in the same way as the main vertical walls of the corresponding rack.

It could also be envisaged that said parallel vertical bulkhead can be selectively positioned at a plurality of different positions between the main vertical walls of the corresponding rack, thus greatly increasing the number of possible widths for the compartments that accommodate the packages.

In a particularly sophisticated embodiment of the invention, it would also be possible to provide for mounting said main lateral walls—and said parallel vertical bulkheads, if provided—movable on guides or rails, so that the distance therebetween can be modified.

As can be seen in FIG. 1, in the illustrated embodiment the removable supporting elements 12, 14 that accommodate the packages to be stored are made in the form of trays or drawers whose edges are adapted to be inserted and slide inside the "C" supports 35 of the vertical walls 33 of the vertical racks 32, 34.

For this purpose, removable supporting elements with different widths will be provided in the loading station 10, in as many as the different widths of the different groups of vertical racks.

In particular, in the example shown in FIG. 1, the loading station will be provided with trays or drawers 12 having said first width L1 of said first vertical rack group 32 and trays or drawers 14 having said second width L2 of said first vertical rack group 34.

Additionally or alternatively to the mechanical coupling between the removable supporting elements 12, 14 and the edges of the supports 35 of the vertical racks, it is also possible to provide a magnetic coupling between said removable supporting elements and said supports.

For this purpose, the edges of said removable supporting elements and/or said supports may be arranged for mutual magnetic coupling.

For example, the edges of the removable supporting elements may be provided with magnets and the supports may be made of ferromagnetic material, or vice versa.

In a particularly simple embodiment of the invention, measuring the package size and evaluating the most suitable location may be done manually.

However, in a preferred embodiment of the invention, the storage arrangement 100 comprises:
  a sensor system for determining the dimensions of the package (in particular, in the embodiment illustrated in FIG. 1, the height and width thereof), and
  a control system provided with a memory unit that allows to determine, based on the output of the aforementioned sensor system and the data contained in said memory unit and relating to the geometry of the storage structure 30 and the packages already present, in which rack 32, 34 to place the new item and in which supports 35 of said rack to insert the tray 12, 14 carrying the package.

The sensor system may include sensors adapted to determine the package size.

However, in an alternative embodiment of the invention, it is also possible to provide that each package is provided with a code in which information relating to its size is stored; in this embodiment, the sensor system will comprise a tool for reading said code.

The storage arrangement 100 may further comprise a robotic handling device 70, provided with gripping means 72 for grasping the trays 12, 14 and controlled by said control system, which transfers the packages from the loading station 10 to the storage structure 30 and thereafter from the latter to the unloading station 50.

In a particularly preferred embodiment of the invention:
  the sensor system determines the package size in all three orthogonal directions (measuring these dimensions or reading a code on said package);
  the control system evaluates, based on the output of said sensor system and the data contained in the memory unit, whether it is more advantageous (in terms of space occupancy optimization) to store the package in the original or rotated position, i.e. rotated (preferably 90°) about a vertical axis, or even tilted, i.e. rotated (preferably 90°) about a horizontal axis.

In this embodiment, the control system communicates the most advantageous configuration (e.g. by displaying them on a screen or similar display means) to an operator so that the operator can arrange the package on the appropriate tray in the suggested position.

Alternatively, it would also be imaginable that the robotic handling device 70 itself is provided with means for turning the package, i.e. for rotating it about a vertical axis, and/or means for tilting the package, i.e. for rotating it about a horizontal axis, and for transferring it in this turned and/or tilted position to the storage structure.

In this embodiment, the storage arrangement preferably comprises a safety system, comprising for example a code shown on the package and detectable by the sensor system, to prevent packages with fragile contents from being rotated (in particular tilted).

In the preferred second embodiment of the invention illustrated in FIG. 2, in addition to the height of the package, both its width and its depth are taken into consideration.

Accordingly, the storage structure 30 comprises a first group of vertical racks 36 whose main vertical walls are arranged at a first distance L1 from each other and have a first depth P1 (understood as extension in a direction perpendicular to the height of said main vertical walls) and a second group of vertical racks 38 whose main vertical walls are arranged at a second distance L2 from each other, different from—and for example greater than—said first distance L1 and have a second depth P2 (understood as extension in a direction perpendicular to the height of said main vertical walls) different from—for example greater than—said first depth P1.

In this way, once a package has been measured at the loading station 10, it will be directed to a rack of the first rack group 36 if its width is less than said first width L1 and its depth is less than said first depth P1 and to a rack of the second rack group 38 only if its width is greater than said first width L1 or its depth is greater than said first depth P1.

In this way, not only the empty lateral spaces between the package and the vertical walls of the rack in which it is received, but also the space behind the package, can be minimized.

Although two rack groups with different widths and depths are illustrated in FIG. 2, it is apparent that the storage structure 30 could comprise any number of vertical rack groups with different widths and depths.

In particular, the number of groups and the values of the selected widths and depths can be selected from time to time depending on the specific applications.

Evidently, trays or drawers of different widths and depths and corresponding to those of the compartments defined on said vertical racks will be provided in the loading station 10.

In the third embodiment illustrated in FIG. 3, the storage structure 30 provides a first group of vertical racks 40 of given width and depth.

In the second rack group 42, compartments of different depths are formed by providing between the main vertical walls of each rack 42 a vertical bulkhead 41 arranged between and perpendicular to the main vertical walls of said rack, so as to define two columns of compartments 42*a*, 42*b* of reduced depth.

In order to be able to access the compartments of both of said columns, the racks 42 of this second group of vertical racks are mounted on rotatable platforms 43, which can be rotated about a vertical axis (in particular 180°) to alternatively provide the operator or robotic handling system 70 access to the compartments of either of said compartment columns 42*a*, 42*b*

As can be clearly seen in FIG. 3, the provision of the rotatable platforms 43 results in a limited increase in dimensions, largely compensated by the possibility of doubling the compartments potentially available on the racks 42 of the second vertical rack group.

Also in the embodiment of FIG. 4, rotatable platforms are used to increase the capacity of the warehouse without a considerable increase in the overall dimensions.

In this embodiment, the storage structure 30 comprises a first vertical rack group comprising vertical racks 44 with a first width and a first depth, a second vertical rack group comprising vertical racks 46 with a second width and a second depth, a third vertical rack group comprising vertical racks 44' with said first width and said first depth and arranged on rotatable platforms 45 on a first row of racks 44'*a* and a second row of racks 44'*b* arranged on opposite sides of the rotation axis of the corresponding rotatable platform 45, and a fourth vertical rack group comprising vertical racks 46' with said second width and said second depth and arranged on rotatable platforms 47 on a first row of racks 46'*a* and a second row of racks 46'*b* arranged on opposite sides of the rotation axis of the corresponding rotatable platform 47.

In this way, by rotating the rotatable platforms 45, 47 by 1800 it will be possible to access the racks of the first row 44'*a*, 46'*a* or, alternatively, the racks of the second row 44'*b*, 46'*b* respectively of said third and said fourth group of vertical racks.

As can be seen in FIG. 4, by appropriately sizing the rotatable platforms and the vertical racks mounted thereon, it will be possible to introduce additional racks (the racks 44'*b* and 46'*b* of the second rows) without a significant increase in the overall dimensions.

From the above description of the storage arrangement 100 according to the invention, it is evident that the method for storing items according to the invention provides for using the arrangement described above and:

measuring at least the item to be stored according to at least two, and preferably three, different perpendicular directions;

comparing the measured width with the values of the different rack widths present in the storage arrangement and/or comparing the measured depth with the values of the different rack depths present in the storage arrangement, selecting rack groups having a width and/or depth sufficient to accommodate the item and, among these rack groups, further selecting the rack group having the lowest width and/or depth;

selecting a rack of the rack group thus selected based on the height of the item to be stored and the heights of the items already stored in said selected rack group;

selecting the supports of the rack thus selected which are located immediately above the item positioned at the uppermost position among those already stored in said selected rack;

transferring the item to be stored—carried by the corresponding removable supporting element—to the supports thus selected.

As described above, the method according to the invention could provide the step of:

measuring at least the item to be stored according to three different perpendicular directions, performing the selection steps described above assuming that:
the item is stored in its current position,
the item is stored in a rotated position (rotated about a vertical axis) of 90°; and
the item is stored in a tilted position (rotated about a horizontal axis) of 90°; and assessing which of the three above scenarios corresponds to the best use of the free space of the storage structure;

if necessary, turning 90° and/or tilting 90° the item to be stored and proceeding to transfer the item to be stored on the selected supports of the selected vertical rack in this position.

In a manner in itself known, the items can be periodically reorganized within the storage structure of the storage arrangement (e.g., at night) to ensure that the utilization of space is constantly optimized.

From the above description, it will be clear to the person skilled in the art that the invention achieves the objects set forth above, as it allows to use the space of the environment in which packages or other items must be stored in a significantly improved manner compared to the known solutions.

It will also be apparent to the person skilled in the art that the embodiments described above have been provided by way of example only and that numerous modifications and variants are possible without departing from the scope of protection as defined by the appended claims.

In particular, the peculiar features of the various embodiments described may be combined with each other (although not explicitly described in this description) without any limitation other than those defined by the claims that follow.

The invention claimed is:

1. A method for storing items, comprising:
providing a storage arrangement which comprises a loading station, a storage structure and an unloading station, wherein the storage structure comprises a plurality of vertical racks, each rack comprising at least a pair of vertical walls arranged parallel and facing and each rack being provided, at least on the faces facing each other, with a plurality of supports, arranged at different heights and adapted to receive removable supporting elements carrying the items to be stored, wherein each removable supporting element, once inserted on respective supports of the facing vertical walls of one of the vertical racks, defines with the vertical walls of said one of the vertical racks a compartment for storing an item, each removable supporting element being adapted to carry a single item and each compartment being consequently adapted to store a single item, wherein the storage structure comprises at least two vertical rack groups, wherein the distance between the vertical walls arranged parallel to and facing each other of the vertical racks of one of the vertical rack groups is different from the distance between the vertical walls arranged parallel to and facing each other of the vertical racks of another one of the vertical rack groups;
measuring an item to be stored according to at least two, different perpendicular directions;
comparing the measured width with the values of the different widths of the vertical racks present in the storage structure, these widths being defined by the distance between the facing vertical walls of said racks;
selecting the vertical rack groups which are wide enough to accommodate the item and, among these vertical rack groups, further selecting the vertical rack group with the lowest width;
selecting a vertical rack of the vertical rack group thus selected based on the height of the item to be stored and the heights of the items already stored in the vertical racks of the selected vertical rack group;
selecting the supports of the vertical rack thus selected which are located immediately above the item positioned at the uppermost position among those already stored in the selected vertical rack;
selecting a removable supporting element of width equal to the width of the selected rack group;
arranging the item to be stored on the selected removable supporting element;
transferring the item to be stored to the storage structure by inserting the removable supporting element on the selected supports of the vertical rack thus selected.

2. A method for storing items according to claim 1, wherein the storage structure of the storage arrangement comprises at least one vertical rack group whose main vertical walls have a first depth and at least one vertical rack group whose vertical walls have a second depth, different from the first depth, and wherein the method comprises:
measuring an item to be stored according to three different perpendicular directions;
comparing the measured width with the values of the different widths of the vertical racks present in the storage structure, these widths being defined by the distance between the facing vertical walls of the racks;
selecting the vertical rack groups which are wide enough to accommodate the item and, among these vertical rack groups, further selecting the vertical rack groups with the lowest width;
from among the vertical rack groups thus selected, selecting the vertical rack groups which are deep enough to accommodate the item and, from among these vertical rack groups, further selecting the vertical rack group with the lowest depth;
selecting a vertical rack of the vertical rack group thus selected based on the height of the item to be stored and the heights of the items already stored in the vertical racks of the selected vertical rack group;
selecting the supports of the vertical rack thus selected which are located immediately above the item positioned at the uppermost position among those already stored in the selected vertical rack;
selecting a removable supporting element of width and depth equal to the width and depth of the selected rack group;
arranging the item to be stored on the selected removable supporting element;
transferring the item to be stored to the storage structure by inserting the removable supporting element on the selected supports of the vertical rack thus selected.

3. A method for storing items according to claim 1, wherein the storage structure of the storage arrangement comprises at least one vertical rack group whose main vertical walls is placed a vertical bulkhead arranged aligned and perpendicular to the main vertical walls and at least one vertical rack group comprising vertical racks without perpendicular vertical bulkhead arranged aligned and perpendicular to the main vertical walls, different from the first depth, and wherein the method comprises:
measuring an item to be stored according to three different perpendicular directions;
comparing the measured width with the values of the different widths of the vertical racks present in the storage structure, these widths being defined by the distance between the facing vertical walls of the racks;
selecting the vertical rack groups which are wide enough to accommodate the item and, among these vertical rack groups, further selecting the vertical rack groups with the lowest width;
from among the vertical rack groups thus selected, selecting the vertical rack groups which are deep enough to accommodate the item and, from among these vertical rack groups, further selecting the vertical rack group with the lowest depth;
selecting a vertical rack of the vertical rack group thus selected based on the height of the item to be stored and the heights of the items already stored in the vertical racks of the selected vertical rack group;
selecting the supports of the vertical rack thus selected which are located immediately above the item positioned at the uppermost position among those already stored in the selected vertical rack;
selecting a removable supporting element of width and depth equal to the width and depth of the selected rack group;
arranging the item to be stored on the selected removable supporting element;

transferring the item to be stored to the storage structure by inserting the removable supporting element on the selected supports of the vertical rack thus selected.

\* \* \* \* \*